United States Patent
Kuster et al.

(10) Patent No.: US 8,786,234 B2
(45) Date of Patent: Jul. 22, 2014

(54) METHOD AND DEVICES FOR DRIVING A DAMPER

(75) Inventors: Beat Kuster, Hombrechtikon (CH); Roy Bearth, Embrach (CH)

(73) Assignee: BELIMO Holding AG, Hinwil (CH)

( * ) Notice: Subject to any disclaimer, the term of this patent is extended or adjusted under 35 U.S.C. 154(b) by 683 days.

(21) Appl. No.: 12/754,278

(22) Filed: Apr. 5, 2010

(65) Prior Publication Data
US 2010/0253270 A1    Oct. 7, 2010

Related U.S. Application Data

(60) Provisional application No. 61/166,911, filed on Apr. 6, 2009.

(51) Int. Cl.
*H02P 1/00*    (2006.01)

(52) U.S. Cl.
USPC ............ 318/452; 318/466; 318/467; 318/438

(58) Field of Classification Search
USPC ......... 318/452, 465, 466, 467, 159, 160, 438, 318/364, 365, 366, 369
See application file for complete search history.

(56) References Cited

U.S. PATENT DOCUMENTS

| | | | | |
|---|---|---|---|---|
| 4,613,798 A * | 9/1986 | Baumann | ...................... | 318/160 |
| 4,725,765 A * | 2/1988 | Miller | ............................ | 318/434 |
| 5,034,671 A * | 7/1991 | Patton et al. | ................... | 318/560 |
| 5,543,694 A * | 8/1996 | Tice | .............................. | 318/379 |
| 5,838,124 A * | 11/1998 | Hill | ............................... | 318/269 |
| 6,051,948 A * | 4/2000 | Vepy | ............................ | 318/626 |
| 6,198,243 B1 * | 3/2001 | Ritmanich et al. | ............ | 318/466 |
| 6,401,690 B1 * | 6/2002 | Kowatari et al. | ............. | 123/399 |
| 6,593,716 B1 | 7/2003 | Lange et al. | | |
| 6,822,409 B2 * | 11/2004 | Lange et al. | .................. | 318/434 |
| 6,940,241 B2 | 9/2005 | Lange et al. | | |
| 7,265,512 B2 * | 9/2007 | McMillan et al. | ............ | 318/663 |
| 7,586,279 B2 * | 9/2009 | Theunissen et al. | .......... | 318/466 |
| 8,084,982 B2 * | 12/2011 | Grabinger et al. | ............ | 318/561 |

* cited by examiner

*Primary Examiner* — Bentsu Ro
*Assistant Examiner* — Thai Dinh
(74) *Attorney, Agent, or Firm* — Sughrue Mion, PLLC

(57) ABSTRACT

An actuator (1) comprises an electrical motor (10) for driving a damper (3) from a rest position to a stalled position. The damper (3) is biased toward the rest position with at least one spring. A control module (2) is configured to supply, upon activation of the actuator (1), a drive current to the electrical motor (10) for driving the damper (3) from the rest position to the stalled position against a bias force produced by the spring. The control module (2) is further configured to reduce the drive current to a lower level for maintaining the damper (3) in the stalled position when a defined duration of time has elapsed since activation of the actuator (1). Damages to the electrical motor (10) and/or gear trains can be avoided without having to provide any circuitry or sensory equipment for measuring the drive current.

7 Claims, 2 Drawing Sheets

METHOD AND DEVICES FOR DRIVING A DAMPER

FIELD OF THE INVENTION

The present invention relates to a method and devices for driving a damper. Specifically, the present invention relates to a method and devices for operating an actuator including an electrical motor to drive a damper from a rest position to a stalled position. More specifically, the present invention relates to a method, an actuator, and a control device for operating an actuator including an electrical motor to drive the damper which is biased toward the rest position with at least one spring.

BACKGROUND OF THE INVENTION

Particularly in HVAC applications (Heating, Ventilating, and Air Conditioning) for climate control in residential, commercial and public buildings, actuators with electrical motors are used to drive dampers in air ducts. The dampers are biased toward a rest position by one or more springs which produce a bias force toward the rest position. Upon activation, i.e. when the actuator or the electrical motor, respectively, is turned on, a drive current is supplied to the electrical motor for driving the damper against the bias force from the rest position toward the stalled position. An increase of the drive current provided to the electrical motor in the stalled position produces an increased torque that may damage the gear train and over time overheat the motor. Typically, to avoid damages to the electrical motor and gear train, sensors are used to detect when the electrical motor has driven the damper to the stalled position. For an actuator, U.S. Pat. Nos. 6,593,716, 6,822,409 and 6,940,241 each describe a current limiter which is configured to detect an increased current above a given level, and to reduce the current to a lower level when such an increased current is detected. In some implementations detection of an increased current is combined with a rotation sensor to determine when the electrical motor has reached the stalled position. For example, in high temperature applications, Hall sensors are used to detect rotation. Nevertheless, the circuitry needed for detecting an increased drive current and possibly rotation of the electrical motor adds complexity and costs to the manufacture of an actuator.

SUMMARY OF THE INVENTION

It is an object of this invention to provide a method and devices for operating an actuator having an electrical motor to drive a damper from a rest position to a stalled position, which method and devices do not have at least some of the disadvantages of the prior art. In particular, it is an object of the present invention to provide a method, an actuator, and a control device for operating an actuator having an electrical motor to drive a damper which is biased toward a rest position with at least one spring, which method, actuator, and control device do not require any circuitry for detecting an increased drive current.

According to the present invention, these objects are achieved particularly through the features of the independent claims. In addition, further advantageous embodiments follow from the dependent claims and the description.

An actuator comprises a control module and an electrical motor for driving a damper from a first position to a second position where it stalls. The damper is biased toward the first position with at least one spring. The control module is configured to supply, upon activation of the actuator, a drive current to the electrical motor for driving the damper from the first position to the second position against a bias force produced by the spring.

According to the present invention, the above-mentioned objects are particularly achieved in that the control module of the actuator or a separate control device for the actuator is further configured to reduce the drive current to a lower level, for maintaining the damper in the second position when a defined duration of time has elapsed since activation of the actuator. Thus, the control module makes it possible to reduce the drive current to a lower level for maintaining the damper in the second position against the bias force, when a defined current reduction time has elapsed since activation of the actuator. Thereby, damages to the electrical motor and/or gear trains can be avoided without having to detect an increased drive current, because the drive current is reduced solely based on a fixed time duration, without any circuitry or sensory equipment for measuring the drive current. For example, for flexible configuration, the value of the defined current reduction time is stored in a data store.

In an embodiment, the control module comprises a timer module configured to determine the duration of time elapsed since activation of the actuator. The control module is further configured to reduce the drive current to the lower level when the duration of elapsed time is equal to or exceeds a defined current reduction time. For example, the control module comprises a microprocessor and a programmed timer module. The programmed timer module includes program code for controlling the microprocessor such that the microprocessor determines the duration of time elapsed since activation of the actuator, compares the duration of time to a defined current reduction time, and produces a signal for switching the drive current to the lower level when the duration of elapsed time is equal to or exceeds the defined current reduction time. Alternatively, the control module comprises a timer circuit configured to switch the drive current to the lower level when a defined duration of time has elapsed since activation of the actuator, for example, an integrated timer component comprising an integrated circuit or a timer circuit composed of discrete electronic components such as an RC-circuit.

In addition to the method, actuator, and control device for operating an actuator with an electrical motor to drive a damper which is biased toward a rest position with at least one spring portable device, the present invention also relates to a computer program product comprising computer program code means for controlling a processor connected to an electrical motor for driving a damper from a first position to a second position where it stalls. Preferably, the computer program product comprises a computer-readable medium containing the computer program code means therein.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
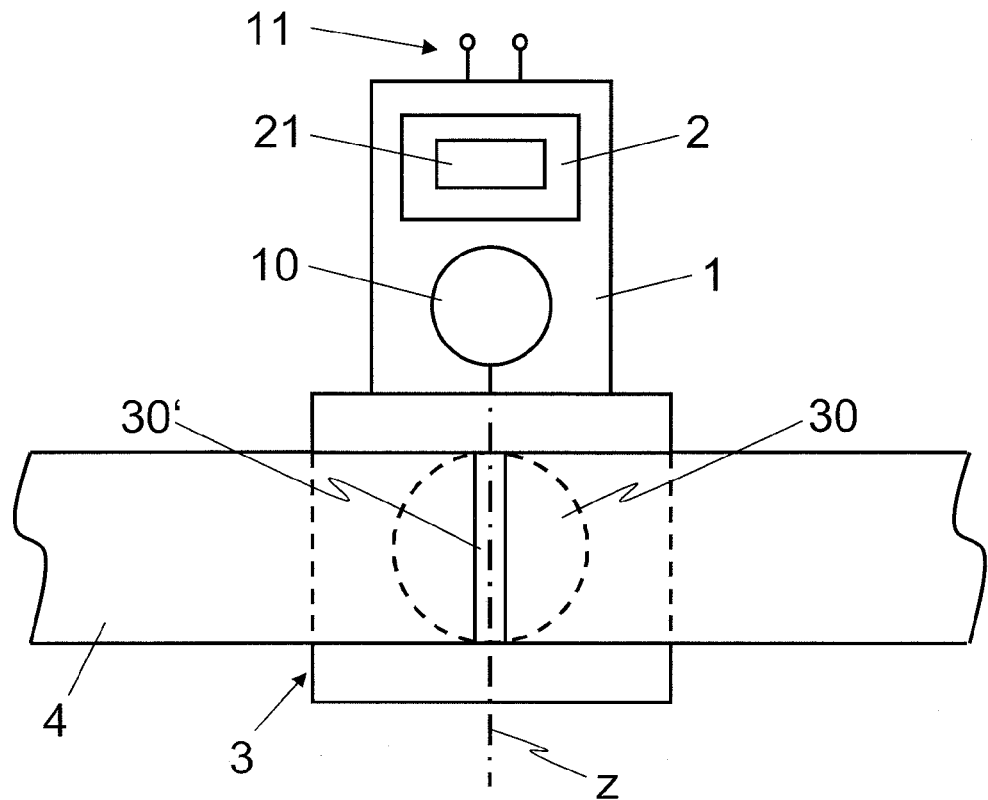
FIG. 1 shows a block diagram illustrating schematically an actuator with an electrical motor which is operatively connected to a damper of an air or fluid conduit depicted in a cross section.

In FIG. 1, reference numeral 3 refers to a damper arranged in a fluid conduit 4, e.g. an air duct, a water pipe or a gas pipe.

For example, the damper 3 is configured as a fire protection flap. In FIG. 1 reference numeral 30 refers to the damper 3 in a first (open) position; reference numeral 30' refers to the damper 3 in a second (closed) position. The damper 3 is biased toward the first (open) position with at least one spring (not illustrated). Although in FIG. 1, the first and second positions are illustrated as open and closed positions, respectively, one skilled in the art will understand that in an alternative application/implementation, the first position is the closed position whereas the second position is the open position.

Figure 2:
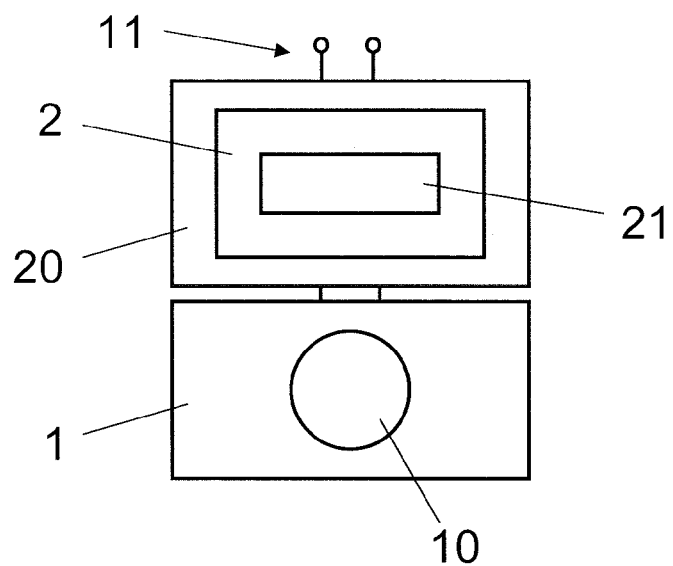
FIG. 2 shows a block diagram illustrating schematically an actuator and a control device arranged in separate housings.

In FIGS. 1 and 2, reference numeral 1 refers to an actuator comprising an electrical motor 10 which is operatively coupled to the damper 3, for driving the damper 3, against the bias force produced by the spring, from the first (rest) position to the second (stalled) position. Preferably, the electrical motor 10 is configured to drive the damper 3 from the first position to the second position by rotating the damper 3 about a rotation axis z. For example, the electrical motor 10 is coupled to the damper 3 through a drive shaft.

As is illustrated in FIGS. 1 and 2, the electrical motor 10 is linked to a control module 2. In the embodiment of FIG. 1, the actuator 1 and the control module 2 are integrated in one common housing, thus the control module 2 is included in the actuator 1. In the embodiment of FIG. 2, the control module 2 is integrated in a control device 20 having a housing separate from the actuator 1. The actuator 1 or the control device 20, respectively, is provided with terminals 11 for connecting an external power supply via the control module 2 to the electrical motor 10.

Figure 3:
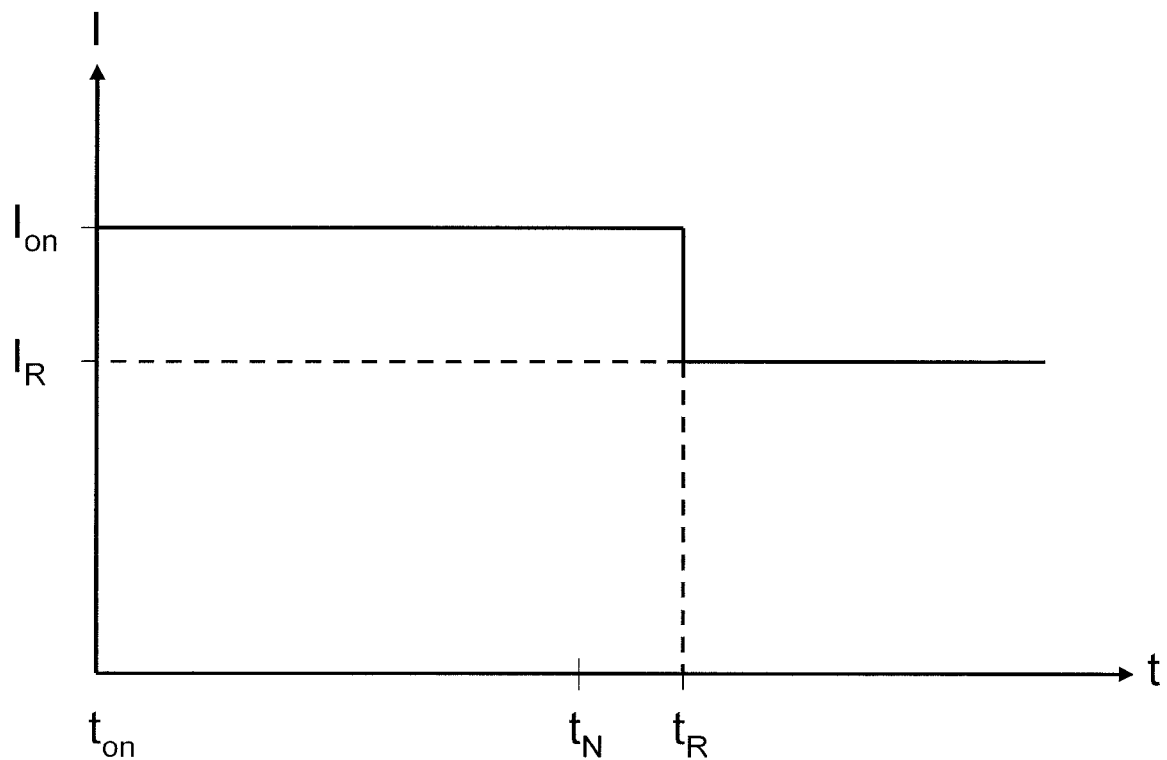
FIG. 3 shows a graph illustrating the reduction of a drive current after a set current reduction time.

The control module 2 is configured to supply a drive current I to the electrical motor 10. As illustrated in FIG. 3, upon activation (time) $t_{on}$, the control module 2 is configured to supply an initial drive current $I_{on}$ to the electrical motor 10 for driving the damper 3 against the bias force from the first position to the second position where the damper 3 stalls (in the closed or open position, respectively). When a defined duration of time has elapsed since activation $t_{on}$ of the actuator 1, the control module 2 supplies to the electrical motor 10 a reduced drive current $I_R$. Thus, the control module 2 is configured to reduce the drive current I, after a fixed current reduction time $t_R$, from the initial drive current $I_{on}$ to a reduced drive current $I_R$ having a lower level than the initial drive current $I_{on}$. The current reduction time $t_R$ is set to a value greater than a nominal time $t_N$ required by the actuator 1 or electrical motor 10, respectively, to drive the damper 3 from the initial position to the stalled position. For example, if the nominal time is $t_N$=15 seconds (or $t_N$=[8 ... 15] seconds), the current reduction time $t_R$ is set to $t_R$=22 seconds. Hence, in the stalled position, the electrical motor 10 is driven with the initial drive current $I_{on}$ only for a limited time of $t_{max}=t_R-t_N$. As illustrated schematically in FIGS. 1 and 2, the control module 2 includes a timer module 21 for determining when the elapsed time corresponds to the defined current reduction time $t_R$. Depending on the embodiment, the timer module 21 is implemented as a programmed timer module or a timer circuit, the timer circuit comprising an integrated timer module component or a timer circuit composed of discrete electronic components.

The programmed timer module includes program code for controlling a microprocessor of the control module 2. The programmed timer module controls the microprocessor such that it measures the duration of time elapsed since activation $t_{on}$ of the actuator 1, and compares the measured elapsed time to the defined current reduction time $t_R$. For example, the value of the current reduction time $t_R$ is stored in a data store of the microprocessor. The current reduction time $t_R$ is defined at manufacturing time and/or can be configured by an authorized operator. When the current reduction time $t_R$ has been reached, the programmed timer module controls the microprocessor to generate and output a control signal for reducing/switching the initial drive current $I_{on}$ to the reduced drive current $I_R$.

The integrated timer module component comprises an integrated circuit such as NE555 for timer or oscillator applications. The integrated circuit is configured to produce the control signal for reducing/switching the initial drive current 6 to the reduced drive current $I_R$ when the current reduction time $t_R$ has elapsed after activation $t_{on}$ of the actuator 1.

The timer circuit composed of discrete electronic components includes a resistor-capacitor circuit (RC-circuit) configured to produce the control signal for reducing/switching the initial drive current $I_{on}$ to the reduced drive current $I_R$ when its capacitor has been charged to a defined level which corresponds to a charging time equivalent to the current reduction time $t_R$.

One skilled in the art will understand that there are various ways of setting the drive current I to an initial drive current $I_{on}$ or a reduced drive current $I_R$, respectively. For example, two separate current sources are implemented to produce from the supplied power the initial drive current $I_{on}$ and the reduced drive current $I_R$, respectively. Consequently, the timer module 21 generates a switching control signal for switching either one of the current sources to the electrical motor 10. Alternatively, a constant current regulator is provided for generating both, the initial drive current $I_{on}$ and the reduced drive current $I_R$. In the latter embodiment, the timer module 21 generates a control signal for controlling the constant current regulator to produce and supply to the electrical motor 10 either the initial drive current $I_{on}$ or the reduced drive current $I_R$.

The invention claimed is:

1. An actuator for a damper in a fluid flow system comprising:
    an electrical motor operable in response to a drive current at a first current level for driving the damper from a first position to a second position where it stalls, the damper being biased toward the first position with at least one spring,
    a data store configured to store a value of a fixed predefined current reduction time,
    an electronic time measurement module,
    an electronic current reducing/switching module that is configured to reduce the drive current to a second current level, which is lower than the first current level, and
    a control module configured to supply, upon activation of the actuator, the drive current at a first current level to the electrical motor for driving the damper from the first position to the second position against a bias force produced by the spring,
    wherein the control module comprises an electronic current reducing/switching module that is configured to reduce the drive current to the second current level, for maintaining the damper in the second position when the fixed and predefined current reduction time, as measured by the electronic time measurement module, has elapsed since activation of the actuator,
    wherein the control module comprises a microprocessor and a programmed timer module, the programmed timer module including program code for controlling the microprocessor such that the microprocessor determines the duration of time elapsed since activation of the actuator, compares the duration of time to the predefined current reduction time, and produces a signal for switching the drive current to the lower level when the duration of elapsed time is equal to or exceeds the fixed and predefined current reduction time.

2. The actuator of claim 1, further comprising a data store configured to store a value of the predefined current reduction time.

3. The actuator of claim 1, wherein the electronic current reducing/switching module is configured to switch the drive current to the lower level when the predefined current reduction time has elapsed since activation of the actuator.

4. A non-transient computer program product comprising a computer-readable medium including computer program code for controlling a processor connected to an electrical motor for driving a damper from a first position to a second position where it stalls, such that
- upon receiving an activation signal, the processor enables supply of a drive current at a first current level to the electrical motor for driving the damper from the first position to the second position against a bias force produced by at least one spring; and
- when a predefined current reduction time, measured by the processor as an elapsed time, has elapsed since receiving the activation signal, the processor switches the drive current to a second current level that is lower than the first current level for maintaining the damper in the second position,
- wherein the computer program code is further operable to control the processor such that the processor:
- determines the duration of time elapsed since receiving the activation signal,
- compares the duration of time to the predefined current reduction time, and
- produces a signal for switching the drive current to the lower level when the duration of elapsed time, measured as an elapsed time, is equal to or exceeds the predefined current reduction time.

5. A control device for an actuator with an electrical motor configured to drive a damper from a first position to a second position where it stalls, the damper being biased toward the first position with at least one spring, the control device comprising:
- an electronic time measurement module, and
- an electronic current reducing/switching module configured to supply, upon activation of the actuator, a drive current at a first current level to the electrical motor for driving the damper from the first position to the second position against a bias force produced by the spring,
- wherein said electronic current reducing/switching module is further configured to reduce the drive current to a second current level that is lower than the first current level for maintaining the damper in the second position when a predefined current reduction time, measured by the electronic time measurement module as an elapsed time, has elapsed since activation of the actuator, and
- further comprising a microprocessor and a programmed timer module, the programmed timer module including program code for controlling the microprocessor such that the microprocessor determines the duration of time elapsed since activation of the actuator, compares the duration of time to the predefined current reduction time, and produces a signal for switching the drive current to the lower level when the duration of elapsed time is equal to or exceeds the predefined current reduction time.

6. The control device of claim 5, further comprising a data store configured to store a value of the predefined current reduction time.

7. The control device of claim 5, comprising a timer circuit configured to switch the drive current to the lower level when the predefined duration of time has elapsed since activation of the actuator.

* * * * *